United States Patent [19]

Thompson

[11] Patent Number: 4,587,920
[45] Date of Patent: May 13, 1986

[54] QUICK WIRE COUPLING AND RELEASE

[75] Inventor: Edward Thompson, Greenville, Miss.

[73] Assignee: REC, Inc., Greenville, Miss.

[21] Appl. No.: 621,241

[22] Filed: Jun. 15, 1984

[51] Int. Cl.$^4$ ............................................. B63B 21/04
[52] U.S. Cl. ..................................... 114/251; 24/644; 114/252
[58] Field of Search ............... 114/199, 200, 218, 251, 114/252; 294/82.27, 82.31; 24/643, 644, 645, 649, 132 R

[56] References Cited

U.S. PATENT DOCUMENTS

| 179,773 | 7/1876 | Doremus | 114/199 |
| 2,870,510 | 1/1959 | Morrow | 24/645 |
| 3,483,841 | 12/1969 | Blackburn | 114/218 |
| 4,166,427 | 9/1979 | Bullard | 114/251 |
| 4,278,042 | 7/1981 | Lindquist | 114/218 |

FOREIGN PATENT DOCUMENTS 25879 5/1860 France ................................ 114/199

Primary Examiner—Galen L. Barefoot
Assistant Examiner—Thomas J. Brahan
Attorney, Agent, or Firm—Harvey B. Jacobson

[57] ABSTRACT

A quick wire coupling and release primarily adapted to provide a quick, safe and economical coupling of river barges into a tow by use of wire rope with the coupling and release also being capable of use in other applications. The quick wire coupling and release includes a wire latch and a rolling cam take-up assembly with one end of a wire rope having a socket and pin thereon which is coupled to the rolling cam take-up assembly and looped around the opposite timber head or fitting on an adjacent barge and brought back through the wire latch to remove slack from the wire rope with the cam assembly providing a final tension to the wire rope thereby securely retaining adjacent barges in abutting engagement to form a single unit.

6 Claims, 11 Drawing Figures

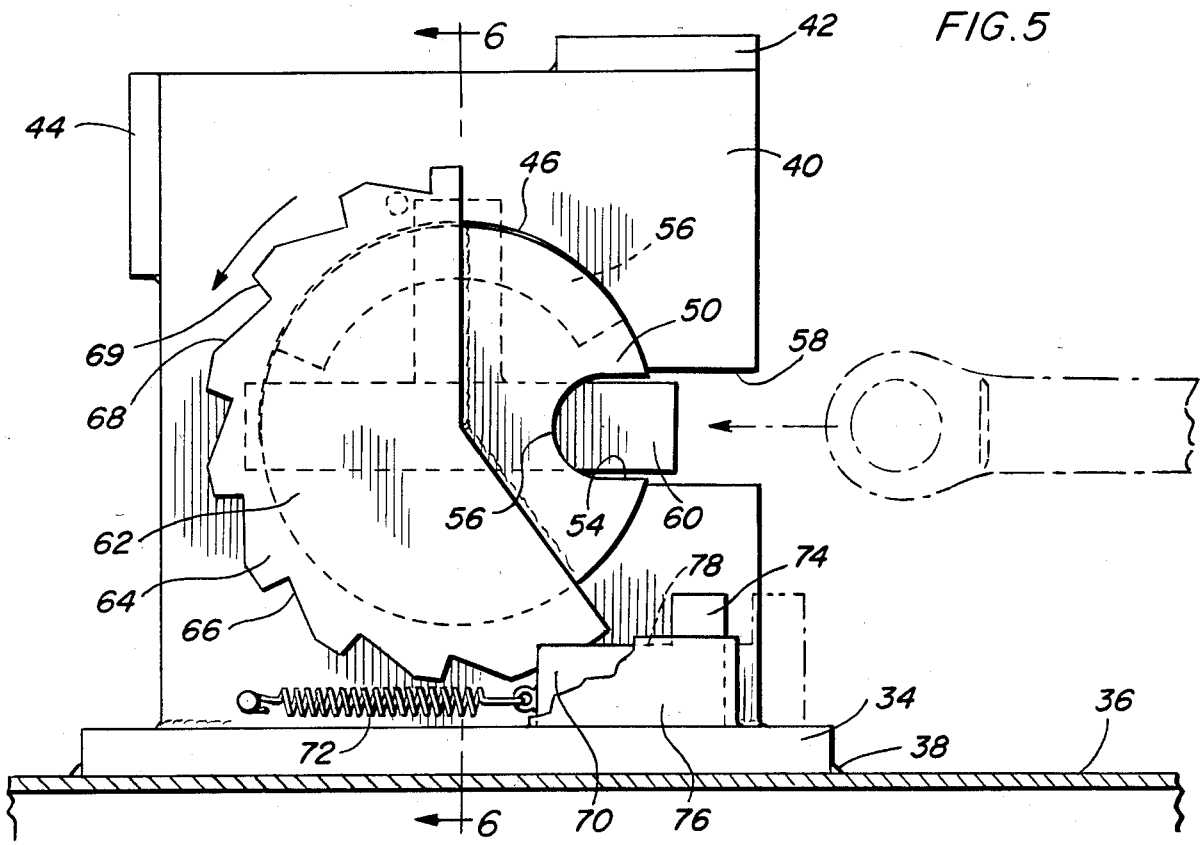
FIG.5
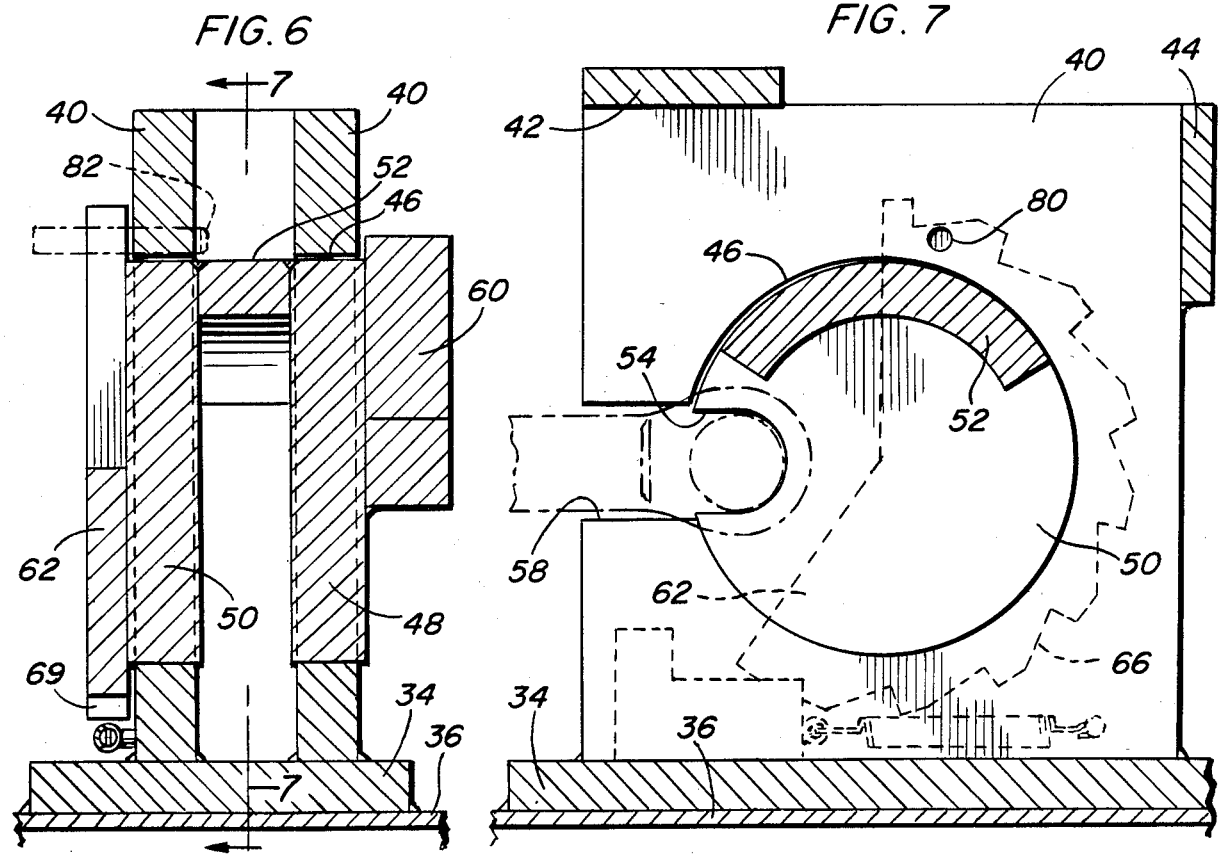
FIG.6
FIG.7

QUICK WIRE COUPLING AND RELEASE

BACKGROUND OF THE INVENTION

1. Field of the Invention

The present invention generally relates to a quick coupling and release for flexible members such as wire rope and while the present invention has general utility, it is especially adapted for use in connecting river barges in secure end to end abutting engagement to retain the barges in a tow to facilitate the handling of the tow by a tug or tugs. The coupling and release involves two basic components, namely, a wire latch assembly and a cam assembly with the cam assembly engaging and receiving a swaged socket and transverse pin rigid therewith on one end of a wire rope and the wire latch engaging the free or bitter end of the wire rope which has been looped around a timber head on an adjacent barge or the like with the wire latch being manipulated in a manner to remove slack from the wire rope so that a latch plate and pawl on the cam assembly can securely tighten the wire rope in place with the wire rope being instantly released by prying the latch pawl to a release position.

2. Description of the Prior Art

The following U.S. patents are relevant to this invention.

U.S. Pat. No. 108,101, 10/11/70,
U.S. Pat. No. 822,058, 5/29/06,
U.S. Pat. No. 2,608,174, 8/26/52,
U.S. Pat. No. 2,722,907, 11/8/55,
U.S. Pat. No. 3,483,841, 12/16/69,
U.S. Pat. No. 4,166,427, 9/4/79.

U.S. Pat. Nos. 108,101 and 822,058 disclose manually operated latches which hold a load in place with no further application of power. U.S. Pat. No. 2,608,174 includes an eccentric sector which engages a wire rope but does not provide any means for tensioning or release at the anchored end. U.S. Pat. No. 2,722,907 discloses a deck fixture to which lines or cables may be attached or connected. U.S. Pat. No. 3,483,841 discloses a device to secure one end of a cable or wire rope which connects two barges with the structure requiring the use of a winch or similar device to take-up the slack and tension the wire rope or cable. U.S. Pat. No. 4,166,427 discloses a relatively complicated and expensive structure requiring a well trained crew to operate.

Conventional barge couplings now in use utilize a minimum of one hoop or loop with links which weighs approximately 50 pounds, one ratchet weighing approximately 65 pounds and one 35 foot wire rope weighing approximately 70 pounds at each of four points per barge. This equipment must be hand carried and placed on the tow at distances up to 1,000 feet. If the tow runs aground this rigging often breaks up and causes metal components to be projected at high velocity somewhat similar to grape shot. In comparison with conventional procedures, the present invention, when in place and welded down, only one wire rope weighing up to 60 pounds need be carried across the tow to each point. When break-up occurs, the wire rope may break but each end is restrained and the placing and tightening of wires or wire ropes may be accomplished in a fraction of the time now required with conventional equipment.

SUMMARY OF THE INVENTION

An object of the present invention is to provide a quick wire rope coupling and release specifically adapted to but not limited to use in combination with river barges to retain adjacent barges in secure, abutting engagement to form a unitary tow with the coupling and release effectively anchoring both ends of a wire rope to one barge with the mid-portion of the wire rope being looped around a timber head or other fitting on an adjacent barge.

Another object of the invention is to provide a quick coupling and release in accordance with the preceding object in which a wire latch assembly and a cam assembly are fixedly secured to the barge with the cam assembly receiving one end of the wire rope which has a swaged socket and transverse pin thereon and the bitter or free end of the wire rope is received in the wire latch which can be manually manipulated to take up slack from the wire rope.

Another object of the invention is to provide a quick wire rope coupling and release in accordance with the preceding object in which the socket pin is inserted into a cam in the cam assembly and rotated to and pinned in a check position and the wire latch is manipulated by the use of a pry bar to rotate the latch segment back and forth to remove slack from the wire rope.

A further object of the invention is to provide a quick coupling and release in accordance with the preceding objects in which the wire rope can be quickly released by removing the check pin and prying the latch pawl to release position.

Still another object of the invention is to provide a quick coupling and release for wire rope, cable or similar flexible members which is simple in construction, dependable and long lasting, safe in operation, economical and requiring a minimum of skilled labor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a side elevational view of the cam assembly.

FIG. 6 is a transverse, sectional view taken substantially upon a plane passing along section line 6—6 on FIG. 5 illustrating further structural details of the cam assembly.

FIG. 7 is a sectional view taken on section line 7—7 on FIG. 6 illustrating further structural details of the cam assembly.

DESCRIPTION OF THE PREFERRED EMBODIMENT

Figure 1:
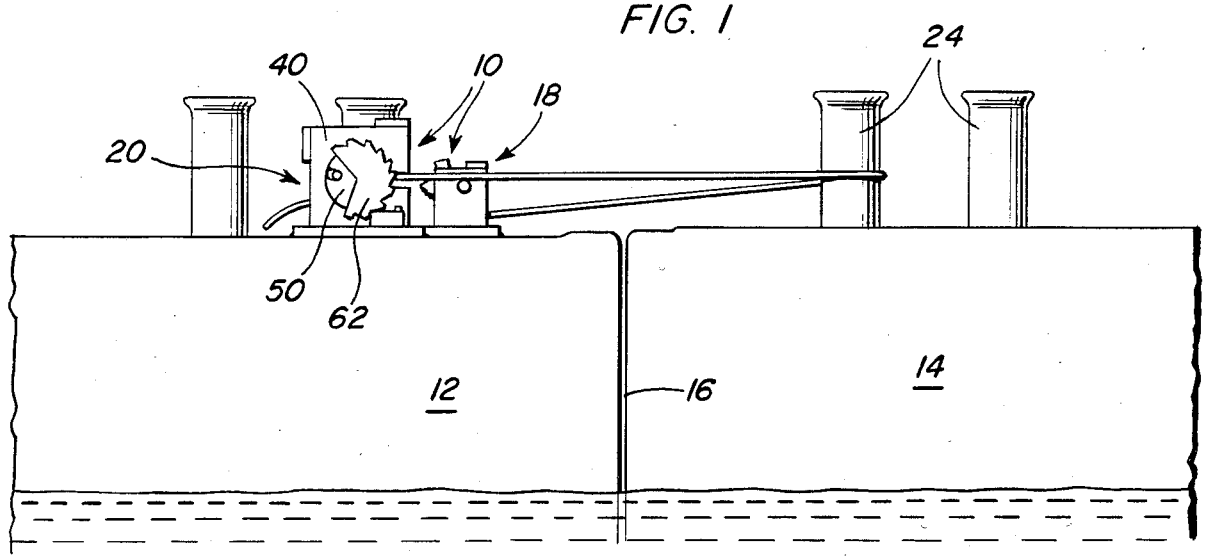
FIG. 1 is a fragmental side elevational view of a pair of adjacent river barges secured in substantially abutting relation by the quick coupling and release of the present invention associated therewith.
Figure 2:
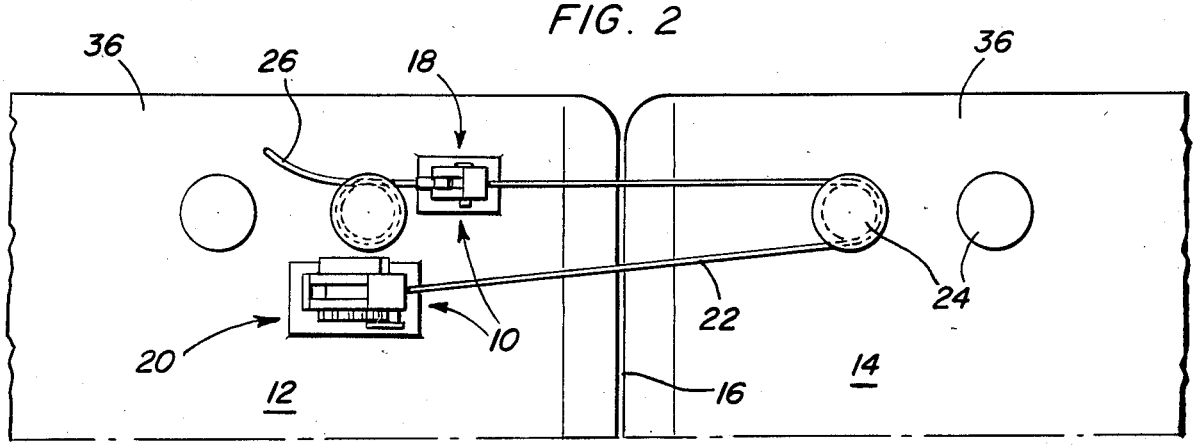
FIG. 2 is a top plan view of the construction of FIG. 1.

Referring now specifically to the drawings, FIGS. 1 and 2 illustrate the quick wire rope coupling and release 10 of the present invention associated with adjacent river barges 12 and 14 which are retained in abutting engagement as at 16 to provide a tow consisting of a plurality of barges connected together in a secure manner so that a tug boat or boats can be used to propel and guide the tow during movement from one point to another in a river or other body of water. It is pointed out that each of the four corners of the barge 12 would be provided with the quick coupling and release 10 of the present invention with the quick coupling and release including two components including a wire latch assembly 18 and a cam assembly 20 engaged with a wire rope 22 having a mid-portion looped around a timber head 24 on the adjacent barge 14 with the bitter or free end 26 being connected with and extending through the wire latch assembly 18 and the other end of the wire rope 22 being engaged with the cam assembly 20 and including a swaged socket 28 thereon with a transverse pin 30 press-fitted into the eye 32 on the swaged socket 28. The swaged socket and eye 32 is a conventional fitting employed on wire rope with the pin 30 being press-fitted therein to become rigid therewith.

With the swaged socket 28 engaged with the cam assembly 20, the central portion or mid-portion of the wire rope 22 may be looped around the fitting or timber head 24 and the bitter end 26 inserted into the wire latch assembly 18 which may be manipulated to remove the slack from the wire rope 22 with the cam assembly 20 then being used for final tightening of the wire rope 22.

The cam assembly 20 is illustrated in FIGS. 3 and 5–8 and includes a base plate 34 rigidly affixed to the deck 36 of the barge 12 by welding 38 or the like with a pair of upstanding side plates 40 being rigidly affixed to the base plate 34. The upstanding side plates 40 are substantially parallel in relation to each other with the top edges being rigidly secured together and maintained in spaced relation by a partial top plate 42 and the vertical side edges of the plates 40 are rigidly interconnected by a partial end plate 44. The central portion of each side plate 40 is provided with a large circular hole 46 which rotatably journals a pair of circular plates 48 and 50 therein with the circular plates being rigidly maintained in spaced relation by an arcuate spacer 52 welded thereto in alignment with a portion of the periphery of the circular plates 48 and 50 thus maintaining the circular plates 48 and 50 in spaced relation with the major portions of the plates 48 and 50 being unconnected by any transverse spacers so that only the arcuate spacer 52 extends between the plates 48 and 50. Each of the plates 48 and 50 includes a radially extending notch or slot 54 having an arcuate inner end 56 which is selectively alignable with a notch or throat 58 in each of the side plates 40 which enables the transverse pin 30 and the eye 32 along with the swaged socket 28 on the wire rope 22 to be inserted through the notches 58 and into the notches or slots 54 in the circular plates 48 and 50 when the notches 54 are aligned with the notches 58 as illustrated in FIG. 5. The plate 48 includes a T-shaped member 60 welded to the exterior surface thereof in which the legs of the T-shaped member 60 extend beyond the periphery of the circular opening 46 thus retaining the circular plates 48 and 50 in alignment with the side plates 40 to prevent lateral movement in one direction and to provide jacking lugs. The plate 50 includes a latch plate 62 in the form of a segment of a circular member having a periphery 64 extending beyond the opening 46 in the other side plate 40 to prevent lateral movement of the plates 48 and 50 in the opposite direction thereby securing the circular plates 48 and 50 rotatably in the circular openings 46 in the side plates 40. The periphery 64 of the segmental latch plate 62 includes a plurality of notches 66 having an elongated surface 68 and a shorter surface 69 oriented in perpendicular relation with the notches 66 engaging the square end of a latch pawl 70 which is oriented for sliding movement on the base 34 adjacent one edge of the side plates 40 as illustrated in FIG. 5 with a tension spring 72 attached to one end of the sliding pawl 70 to bias it toward the plate 62. A handle or lug 74 is provided on the pawl 70 adjacent its opposite end by which the pawl 70 can be retracted and released from engagement with the notched latch plate 62. The pawl 70 is retained in guided relation by an upstanding plate 76 which may include a portion 78 which overlies the pawl 70 to retain it in place and together with one side plate 40 forms a guide for the pawl 70. The plate 40 having the latch plate 62 alongside thereof is provided with an aperture 80 for receiving a check pin 82 for locking the latch plate 62 in a check position in a manner described hereinafter.

Figure 3:
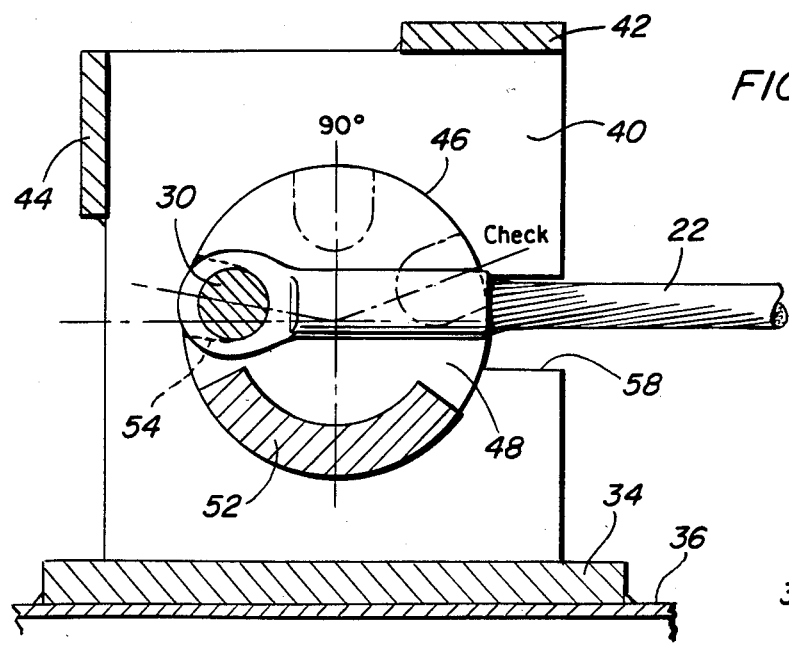
FIG. 3 is a sectional view of the cam assembly forming one component of this invention.
Figure 4:
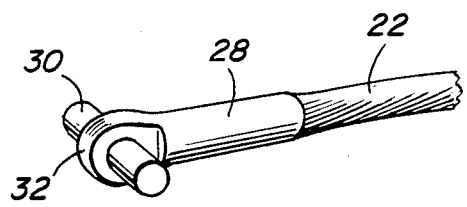
FIG. 4 is a perspective view illustrating the swaged socket and pin on one end of the wire rope.
Figure 8:
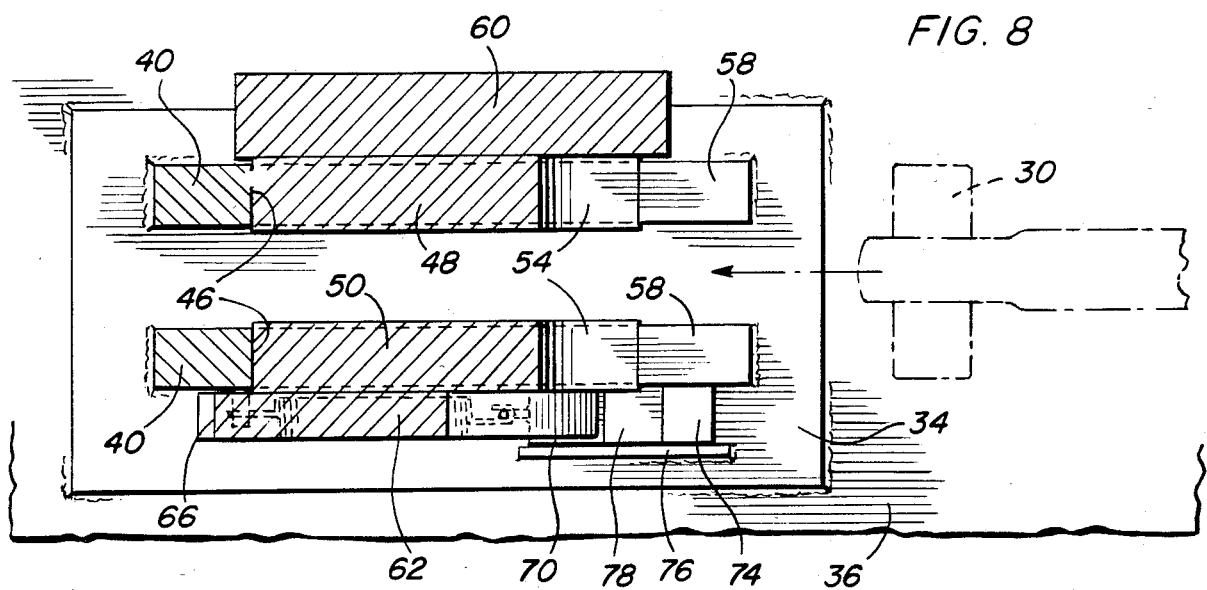
FIG. 8 is a horizontal, plan sectional view illustrating further structural details of the cam assembly.

The T-shaped member 60 forms jacking lugs for rotating the plates 48 and 50 as well as the spacer 52 and the latch plate 62 when the latch pawl 70 is retracted. As indicated by the arrow in FIG. 5, the plates 48 and 50 and the spacer 52 are rotatable in a counterclockwise direction from a position illustrated in FIG. 5 where the pin 30 can be received through the throat or notches 58 into the notches 54 and then rotated in relation thereto to a fully retracted position at 175° therefrom or to a check position as illustrated in FIG. 3.

Figure 9:
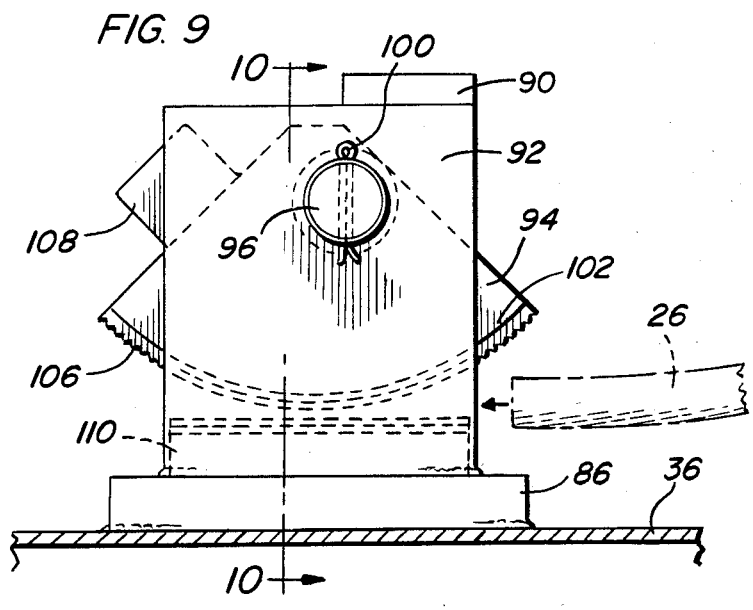
FIG. 9 is a side elevational view of the wire latch assembly.
Figure 10:
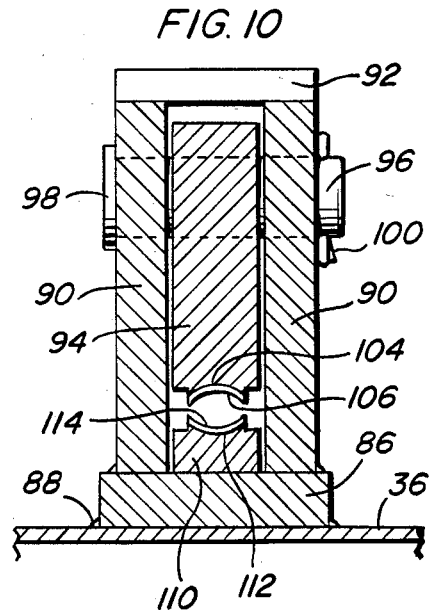
FIG. 10 is a vertical sectional view taken substantially upon a plane passing along section line 10—10 on FIG. 9 illustrating further structural details of the wire latch assembly.
Figure 11:
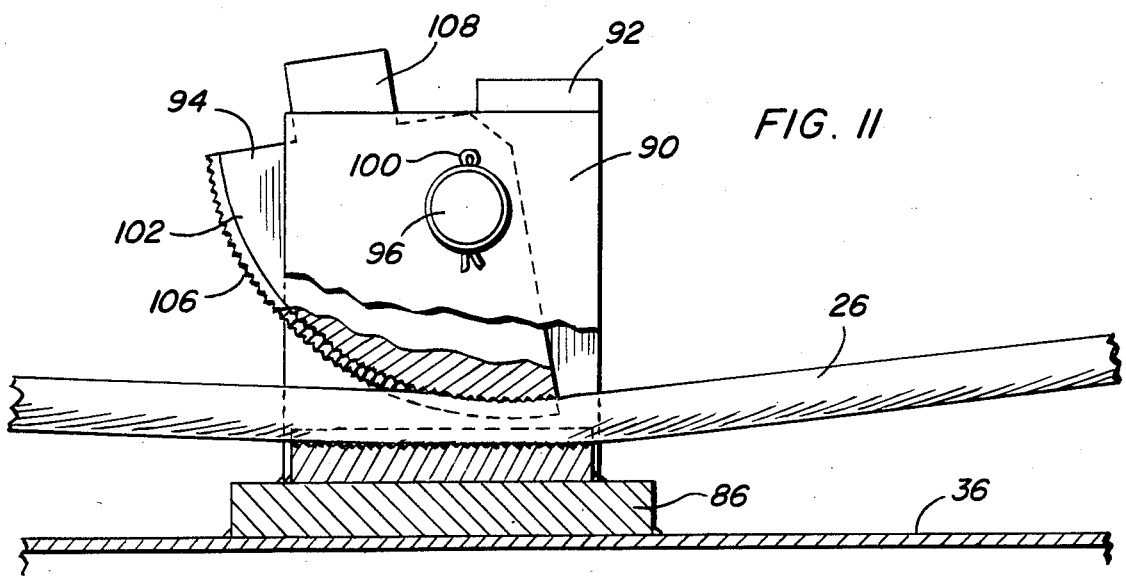
FIG. 11 is a side elevational view of the wire latch assembly similar to FIG. 9 but illustrating the bitter or free end of the wire rope associated with the arcuate sector therein.

FIGS. 9–11 illustrate the specific details of the wire latch assembly 18 which includes a base plate 86 welded to the deck 36 by peripheral welding 88 with a pair of side plates 90 being rigidly affixed to the base 86 in vertical parallel and spaced relation with the upper ends of the side plates 90 being interconnected by a partial top plate 92. An arcuate sector plate 94 is positioned between the side plates 90 and pivotally supported therefrom by a pivot pin 96 having a head 98 on one end thereof and a fastener 100 extending through the other end, preferably in the form of a cotter pin or the like with the pivot pin 96 being eccentrically related to the center of the arcuate edge 102 of the sector plate 94 as illustrated in FIGS. 9 and 11. The arcuate edge 102 is transversely concave as indicated by numeral 104 and is provided with a plurality of transversely extending concave teeth 106 formed in the concave surface 104. A projecting lug or socket 108 is fixed rigidly to one radial side edge of the sector plate 94 as illustrated in FIG. 9 with the lug 108 being on the side of the sector plate 94 opposite to the offset of the eccentric pivot pin 96.

An elongated fastening bar 110 is fixed to the upper surface of the base 86 by welding or the like and includes a transverse concave upper surface 112 having a plurality of transversely extending teeth 114 thereon which are disposed in opposing relation to the teeth 106 on the sector plate 94 as illustrated in FIGS. 9–11 for receiving and engaging the bitter or free end 26 of the wire rope 22 therebetween as illustrated in FIGS. 9 and 11. The fastening bar 110 is welded to the upper surface of the base 86 so that as the sector plate 94 is pivoted, the spatial relationship between the teeth 106 on the sector plate 94 and the teeth 114 on the fastening bar 110 will vary.

The dimensional characteristics of the components of the invention may vary depending upon the particular use for which it is intended. When used in coupling river barges, it is conventional practice to use a one inch wire rope as the barge wire 22. The cam assembly 20 has side plates 40 being generally 13 inches in height and 12 inches in horizontal length and 1½ inches in thickness. Likewise, the rotatable or rolling cam plates 48 and 50 may be 1½ inches thick and provided with a two inch spacer therebetween and have an 8 inch diameter with the pin notches 54 being two inches in width and the throat notches 58 in the plates 40 being 2¼ inches in width. As pointed out, these dimensions may vary and are included to provide information with respect to the size and strength characteristics of the components of the invention. The wire latch 18 is somewhat smaller with the side plates being approximately seven inches in height and six inches in horizontal dimension and one inch in thickness with the sector plate being an inch and one-half in thickness and supported by a pivot pin having a diameter of approximately one and one-half inches. The reduced width of the arcuate edge 102 of the sector plate 94 and the concave edge 112 of the fastening bar 110 may be approximately one inch in width so that the matching concave, toothed surfaces effectively engage the one inch diameter barge wire. The lug 108 is preferably a square tube approximately one and one-half inches in length and two inches square.

In use of the present invention, the bitter or free end 26 of the wire rope 22 is simply inserted into the face end of the wire latch assembly 18, as illustrated in FIG. 9, and pushed or drawn through by hand until all free slack is taken up. A suitable handle, pry bar or tool may be connected with the lug 108 to lock the sector plate 94 in position to securely grip the bitter end 26 of the wire rope due to the eccentricity of the sector plate 94 securely gripping the wire rope between the teeth 106 and 112 with the lug 108 also being used to release the wire latch assembly 18 when desired. After all free slack is taken up by hand, a pry bar is utilized on the jacking lugs 60 on the cam assembly 20 in order to rotate the cam plates 50 and 48 to take up the remaining slack and tension the wire. In connecting the wire rope 22 to the cam assembly, the swaged socket and pin is inserted into the cam assembly when the components are oriented as illustrated in FIG. 5 and the cam plates 48 and 50 and the latch plate 62 is rotated to the check position and pinned there by inserting the check pin 82 into aperture 80 when the edge of latch plate 62 is pivoted past the aperture thus securing the socket and pin in the check position. Then, the free end of the wire rope is looped around the timber head 24 on the adjacent barge 14 and brought back through the wire latch 18. With the free end of the wire rope in one hand and a pry bar in the other, a person may rotate the sector plate 94 in an oscillating motion to remove slack from the wire rope and the plate 94 pivoted to lock the wire rope in position. Then, the cam plates 48 and 50 and the latch plate 62 may be rotated by use of the jacking lugs on plate 60 as the latch pawl 70 moves out of the way as the spring 72 is elongated to tension the wire rope and move the cam assembly from the check position to any position up to the fully retracted position which is approximately 175° from the insert position as illustrated in FIG. 3 with the latch pawl 70 automatically retaining the latch plate 62 in the position for fully tensioning the wire rope 22. When it is desired to instantly disengage the coupling, it is only necessary to remove the check pin and pry the latch pawl 70 into disengaged relation to the notches 66 so that the cam assembly can rotate to a release position with the notches 54 in the rotating plates 48 and 50 in alignment with the throat notches 58 in the side plates 40. Thus, with this construction, adjacent barges 12 and 14 may be quickly and securely coupled in a safe manner with permanent installation of these components requiring personnel to carry a minimum number of components across barge surfaces when making up a tow. Also, this structure enables the barges to be readily released when desired and when a tow runs aground, the components will not become shrapnel which can result in substantial injury problems to adjacent personnel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A quick wire coupling and release comprising a wire latch assembly and a cam assembly with the wire latch assembly receiving the bitter end of a wire rope or the like and the cam assembly receiving a transverse pin on a swaged socket at the end of a wire rope or the like, said cam assembly including a check position to secure the swaged socket and transverse pin to the cam assembly, said wire latch assembly enabling slack in the wire rope or the like to be taken up by hand and by manual manipulation of the wire latch assembly, said cam assembly including a fully retracted position to final tension the wire rope or the like when moved from the check position to the fully retracted position, said cam assembly including a pair of side plates, each having a notch in the vertical edge thereof, a pair of cam plates rotatably supported from the side plates and including radial notches therein for alignment with the notches in the side plates to receive the swaged socket and transverse pin on the end of a wire rope or the like, a lug on one of the cam plates to rotate the cam plates to a check position in which the notches in the cam plates are out of registry but adjacent to the notches in the side plates to lock the wire rope to the cam assembly without moving the wire rope longitudinally to any appreciable extent.

2. The structure as defined in claim 1 wherein one of said cam plates includes a latch plate rigid therewith with the latch plate including peripheral notches, a latch pawl movably mounted on the cam assembly and engaging the notches on the latch plate for enabling rotation in one direction and preventing rotation of the latch plate in the other direction thereby enabling the cam plates to be rotated from the check position to a fully retracted position in which the notches in the cam plates are moved to a position substantially opposite to the notches in the side plates with respect to the center of rotation of the cam plates to move the wire rope longitudinally to an appreciable extent to tighten the wire rope.

3. The structure as defined in claim 2 wherein said latch pawl is reciprocally mounted with respect to the side plate and generally tangential to the latch plate and being spring-biased into latching position, said pawl including an upstanding lug forming a handle for manipulation thereof whereby a pry bar or similar tool may be used to release the latch pawl to release the cam assembly from its fully retracted position for movement to a released position with the notches in the cam plates in alignment with the notches in the side plates thereby enabling substantial longitudinal movement of the wire rope to tighten the wire rope when the cam plates are rotated from the check position to the fully retracted position and enabling release of the wire rope from the cam assembly when the latch pawl is released to enable the notches in the cam plates to move into alignment with the notches in the side plates for release of the swaged socket and transverse pin on the end of the wire rope.

4. A quick wire coupling and release comprising a wire latch assembly and a cam assembly with the wire latch assembly receiving the bitter end of a wire rope or the like and the cam assembly receiving a transverse pin on a swaged socket at the end of a wire rope or the like, said cam assembly including a check position to secure the swaged socket and transverse pin to the cam assembly, said wire latch assembly enabling slack in the wire rope or the like to be taken up by hand and by manual manipulation of the wire latch assembly, said cam assembly including a fully retracted position to final tension the wire rope or the like when moved from the check position to the fully retracted position, said wire latch assembly including a base plate having a pair of upstanding side plates rigid therewith, an arcuate member eccentrically mounted pivotally between the side plates and including transverse teeth on the arcuate surface of the arcuate member, a fastener bar rigidly mounted between the side plates in opposed relation to the arcuate surface of the arcuate member and including transverse teeth thereon for receiving the bitter end of the wire rope or the like therebetween with the eccentric mounting of the arcuate member enabling clamping and release of the wire rope or the like, and means on the arcuate member to enable manual pivotal movement thereof to enable the wire rope or the like to be pulled between the toothed surfaces when the arcuate member is released and tightly gripped therebetween when the arcuate member is moved to a clamping position, said arcuate member including a lug on one surface thereof for receiving a leverage tool to enable the arcuate member to be pivoted between a clamped and released position with respect to the wire rope, said arcuate surface on the arcuate member and the toothed surface on the fastener bar being transversely concave for conforming with the periphery of the wire rope or the like, said cam assembly including a pair of side plates, each having a notch in the vertical edge thereof, a pair of cam plates rotatably supported from the side plates and including radial notches therein for alignment with the notches in the side plates to receive the swaged socket and transverse pin on the end of a wire rope or the like, a lug on one of the cam plates to rotate the cam plates to a check position in which the notches in the cam plates are out of registry but adjacent to the notches in the side plates to lock the wire rope to the cam assembly without moving the wire rope longitudinally to any appreciable extent.

5. The structure as defined in claim 4 wherein one of said cam plates includes a latch plate rigid therewith with the latch plate including peripheral notches, a latch pawl movably mounted on one of the side plates engaging the notches on the latch plate for enabling rotation in one direction and preventing rotation of the latch plate in the other direction thereby enabling the cam plates to be rotated from the check position to a fully retracted position in which the notches in the cam plates are moved to a position substantially opposite to the notches in the side plates with respect to the center of rotation of the cam plates, said latch pawl being reciprocally mounted with respect to the side plate and generally tangential to the latch plate and being spring-biased into latching position, said pawl including an upstanding lug forming a handle for manipulation therof whereby a pry bar or similar tool may be used to release the latch pawl to release the cam assembly from its fully retracted position for movement to a released position with the notches in the cam plates in alignment with the notches in the side plates thereby enabling substantial longitudinal movement of the wire rope to tighten the wire rope when the cam plates are rotated from the check position to the fully retracted position and enabling release of the wire rope from the cam assembly when the latch pawl is released to enable the notches in the cam plates to move into alignment with the notches in the side plates for release of the swaged socket and transverse pin on the end of the wire rope.

6. In combination, a pair of adjacent river barges adapted to be positioned in abutting engagement in a tow, one of said barges having a fitting thereon adjacent an edge thereof, a barge wire having a portion engaged with said fitting, one end of said barge wire including a swaged socket and transverse pin with the other end of the barge wire being a bitter end, means on the other barge for adjustably anchoring the socket and pin end of the barge wire thereto, and means on the other barge to adjustably clamp the bitter end of the barge wire thereto to tighten the barge wire and maintain the barges in a tow, said means to adjustably clamp the barge wire including a stationary fastener bar and an eccentrically pivotally mounted plate in opposed relation to the fastener bar to selectively clamp the bitter end of the barge wire therebetween, and means on said arcuate plate for manually pivoting it to clamped and released position thereby enabling the bitter end of the barge wire to be inserted between the fastener bar and arcuate plate and manually pulled with one hand while oscillating the arcuate plate with the other to remove slack from the barge wire, said means on the other barge adjustably anchoring the socket and pin end of the barge wire thereto including a pair of rotatable members mounted in spaced relation with each member including a notch in the periphery thereof to receive the socket between the members and the pin in the notches, means connected with said rotatable members to manually rotate said members, means engageable with said rotatable members to releasably retain them in an initial check position in which the rotatable members have been rotated to a position anchoring the socket and pin thereto without appreciable linear movement of the barge wire after which the bitter end of the barge wire can be adjustably clamped between the fastener bar and arcuate plate, and means engageable with said rotatable members to releasably retain them in a final fully retracted position with substantial linear movement of the barge wire to tension the barge wire.

* * * * *